(12) United States Patent
O (10) Patent No.: US 10,277,757 B2
(45) Date of Patent: Apr. 30, 2019

(54) ELECTRONIC DEVICE AND IMAGE FORMING APPARATUS

(71) Applicant: KYOCERA Document Solutions Inc., Osaka (JP)

(72) Inventor: Kin O, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 89 days.

(21) Appl. No.: 15/581,015

(22) Filed: Apr. 28, 2017

(65) Prior Publication Data

US 2017/0331964 A1 Nov. 16, 2017

(30) Foreign Application Priority Data

May 12, 2016 (JP) .................................. 2016-096322

(51) Int. Cl.
*H04N 1/00* (2006.01)

(52) U.S. Cl.
CPC ..... *H04N 1/00424* (2013.01); *H04N 1/00392* (2013.01); *H04N 1/00411* (2013.01); *H04N 1/00435* (2013.01); *H04N 1/00474* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2012/0064947 A1* | 3/2012 | Yi | G06F 3/0483 455/566 |
| 2013/0076669 A1* | 3/2013 | Ando | G06F 3/04886 345/173 |
| 2013/0077119 A1* | 3/2013 | Arai | B41J 29/00 358/1.13 |
| 2013/0299570 A1* | 11/2013 | Ting | G06F 3/1204 235/375 |
| 2014/0123183 A1 | 5/2014 | Fujimoto et al. | |
| 2017/0103423 A1* | 4/2017 | Glover | G06Q 30/0267 |

FOREIGN PATENT DOCUMENTS

JP 2012-230658 A 11/2012

OTHER PUBLICATIONS

Notice of Reasons for Refusal dated Nov. 27, 2018 mailed in the corresponding Japanese Patent Application No. 2016-096322.
Author:Pauls,[online] Internet<URL:http://www.appbank.net/2015/09/25/iphone-news/1100653.php>, the Appbank website, Sep. 25, 2015[Search Date Nov. 6, 2018].
Author:Tio, [online] Internet <URL:www.amedama.com/blog/201112241422.html>,Dec. 24, 2011[Search Date Nov. 6, 2018].

* cited by examiner

*Primary Examiner* — Fan Zhang
(74) *Attorney, Agent, or Firm* — IP Business Solutions, LLC (57) ABSTRACT

An electronic device includes an operation unit and a controller. In a case of detecting a long-press at an icon arranged on a home screen, the controller allows a display unit to display, at a predetermined position near a display region of the icon, a submenu image for selecting detailed settings for a function associated with the icon. When detecting that a touch operation performed by a user is moved from the icon to the submenu image and then ended at the submenu image, the controller allows the display unit to display a detailed setting screen for setting detailed setting items indicated by the submenu image.

5 Claims, 9 Drawing Sheets

REDY TO SEND.  NUMBER OF DESTINATION 3  473

| DESTINATION | DETAIL |
|---|---|
| ABCD | abcd@efg.com |
| TUVW | 192.168.188.120 |
| GROUP 1 | GROUP 1 |

< 1/1 >

| ON HOOK | DIRECT | CHAIN | DETAIL/EDIT | RESET | RECALL |

| 0001 AAA | 0002 BBB | 0003 CCC | 0004 DDD | 0005 EEE |
| 0006 FFF | 0007 GGG | 0008 HHH | 0009 III | 0010 JJJ |

NO. < 1/100 >

ADDRESS BOOK
NEW MAIL
NEW FOLDER
NEW FAX
NEW I-FAX
WSD SCAN

DESTINATION | QUICK SETUP | ORG./SENDING DATA FORMAT | COLOR/IMAGE QUALITY | ADVANCED SETUP | PROGRAM

Fig.5

EDIT DESTINATION – ADDRESS BOOK

473

SORT [NAME] »

| NO. | NAME | DETAIL |
|------|---------|--------|
| 0001 | USER 01 | |
| 0002 | USER 02 | |
| 0003 | USER 03 | |
| 0004 | USER 04 | |
| 0005 | USER 05 | |

< 1/1 >

[SEARCH(NAME)]
[SEARCH(NO.)]
[ADD]
[DETAIL]
[DELETE]

[ABC] [DEF] [GHI] [JKL] [MNO] [PQRS] [TUV] [WXYZ] [0-9]

[CONTACT] [GROUP]

[CLOSE]

ELECTRONIC DEVICE AND IMAGE FORMING APPARATUS

INCORPORATION BY REFERENCE

This application claims priority to Japanese Patent Application No. 2016-096322 filed on May 12, 2016, the entire disclosure of which are incorporated herein by reference.

BACKGROUND

The present disclosure relates to electronic devices and image forming apparatuses, and particularly relates to a technique of easily displaying setting-information for various functions on a device provided with a touch panel type display unit.

Many cases of the image forming apparatuses such as printers and multifunction peripherals have the touch panel type display unit. The touch panel type display unit displays an operation screen provided for each of functions such as a copy function and a send function and so on. By touching the operation screen, a user can set detailed items for to the functions included in the image forming apparatus and instruct execution of the functions. It is required in such multifunctional display devices that the user can easily select desired items. For example, a technique is known in which a plurality of icons is arranged in a circle around a content display area provided in the center of a display screen so that the user can select the desired items.

SUMMARY

The disclosure proposes further improvement of the foregoing technique.

In one aspect, the disclosure provides an electronic device including an operation unit and a controller. The operation unit includes a display unit having a touch panel and receives a user's instruction through a touch operation performed by the user on the display unit. The controller includes a processor and, based on operation of the processor in accordance with an operation program, allows the display unit to display an operation screen of the electronic device. The operation screen has a hierarchical structure in which a home screen is arranged in an uppermost layer in the hierarchical structure. The home screen is arranged with icons each indicating functions operable by the electronic device respectively.

In a case of detecting a short-press at one of the icons arranged on the home screen, the controller allows the display unit to display a top operation screen in the hierarchical structure of the function indicated by the one icon.

In a case of detecting a long-press at the one icon arranged on the home screen, the controller allows the display unit to display, at a predetermined position near a display region of the one icon, a submenu image for selecting detailed settings for the function associated with the one icon, in which the submenu image is arranged at a layer lower than the top operation screen.

When detecting that the touch operation performed by the user is moved from the one icon to the submenu image and then ended at the submenu image, the controller allows the display unit to display a detailed setting screen for setting detailed setting items indicated by the submenu image.

In another aspect, the disclosure provides an image forming apparatus including the electronic device described above and an image forming unit that forms an image on a recording medium.

DETAILED DESCRIPTION

Figure 1:
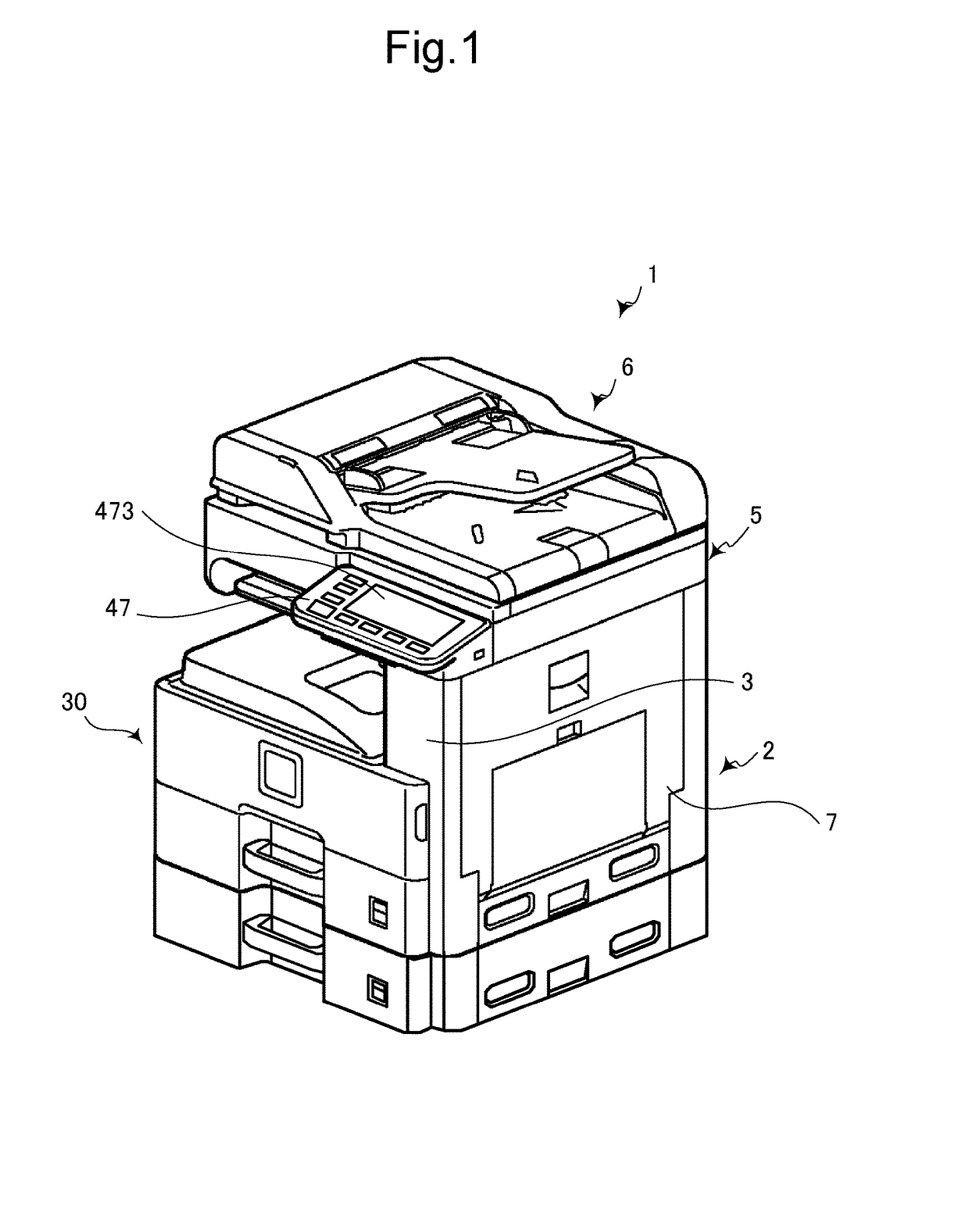
FIG. 1 is a perspective view showing an appearance of an image forming apparatus according to an embodiment of the disclosure.

Hereinafter, a description will be given of an image forming apparatus as one example of an electronic device according to one embodiment of the disclosure with reference to the drawings. FIG. 1 is a perspective view showing an appearance of the image forming apparatus according to the one embodiment of the disclosure.

An image forming apparatus 1 according to the one embodiment of the present disclosure is a multifunction peripheral having a plurality of functions, such as facsimile transmission, copying, printing, and scanning. As shown in FIG. 1, the image forming apparatus 1 includes a main body 2, an image reading unit 5 located above the main body 2, and a joint portion 3 provided between the image reading unit 5 and the main body 2.

A casing 7 constituting an outer shell of the image forming apparatus 1 accommodates therein a plurality of components that serves to realize the various functions of the image forming apparatus 1. For example, the image reading unit 5, an image forming unit 12 (illustrated in FIG. 2), a fixing unit 13 (illustrated in FIG. 2), and a paper feed unit 30 are provided inside the casing 7.

An operation unit 47 is a user interface device serving as a device for the user to operate the image forming apparatus 1 and input information such as letters or numerals. The operation unit 47 includes a display unit 473 of a touch panel type for displaying an operation guidance screen and a setting screen provided for each of the functions and so forth to the user. The functions include, for example, a copy function, a scan function, and a facsimile function, the functions that are operable by the image forming apparatus 1. The operation unit 47 detects user's touch operation performed on icons and buttons displayed on the display unit 473, and in accordance with the touch operation, receives a setting for detailed items for each of the functions included in the image forming apparatus 1 and an execution instruction of each of the functions. The display unit 473 has a function capable of detecting, through a touch panel function, the user's touch operation in which touching on at least two points is performed.

Figure 2:
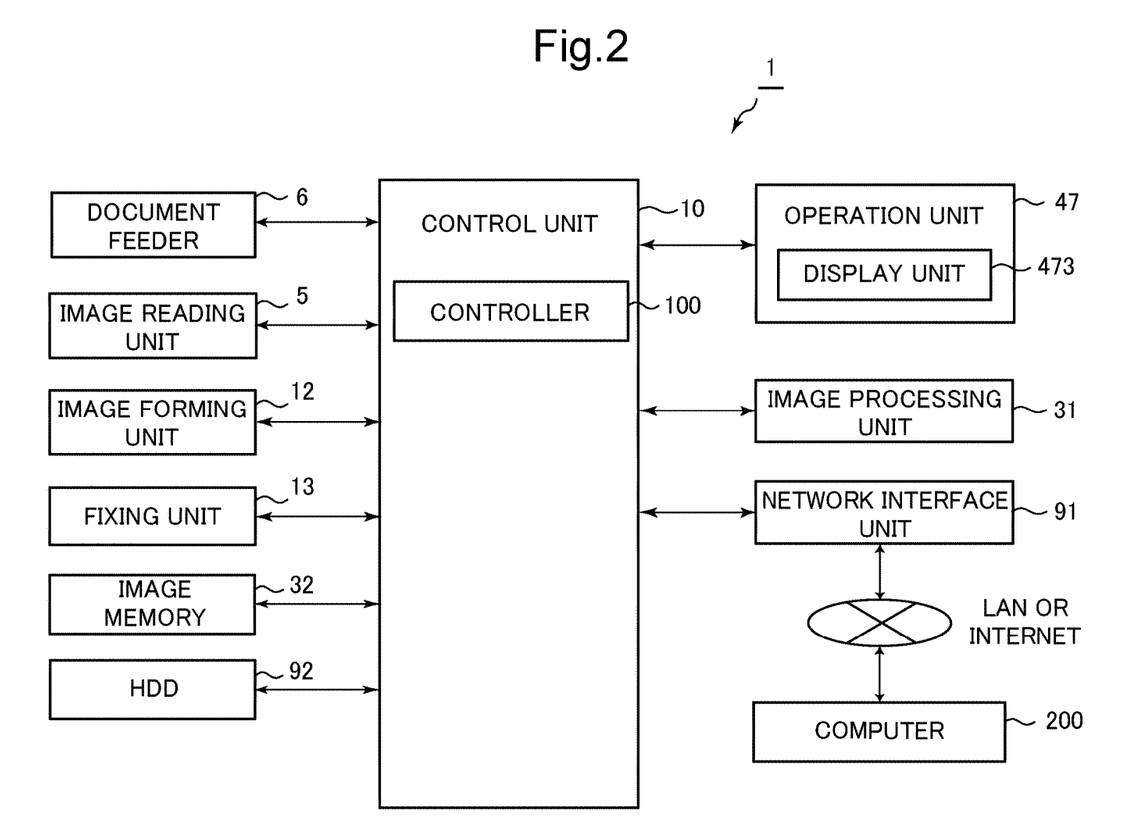
FIG. 2 is a functional block diagram showing an example of an essential internal configuration of the image forming apparatus.

Configurations of the image forming apparatus 1 will be described. FIG. 2 is a functional block diagram showing an example of an essential internal configuration of the image forming apparatus 1.

The image forming apparatus 1 includes a control unit 10. The control unit 10 includes, for example, a processor, a random access memory (RAM), a read only memory (ROM), and an exclusive hardware circuit. The processor is, for example, a central processing unit (CPU), a microprocessor unit (MPU), and an application specific integrated circuit (ASIC).

The document reading unit 5 includes a reading mechanism including a light emitting unit and a CCD sensor, to be controlled by the control unit 10. The document reading unit 5 illuminates a source document with the light from the light emitting unit and detects the reflected light with the CCD sensor, to thereby read the image on the source document. The document reading unit 5 reads, in a set reading-size, the image on the source document transported from a document feeder 6.

An image processing unit 31 performs image processing on source images read by the image reading unit 5 in response to the needs.

The image memory 32 is a region for temporarily storing the source images read by the image reading unit 5, and image data to be formed into an image by the image forming unit 12.

The image forming unit 12 forms images of, for example, the source images read by the image reading unit 5 and printing data received via a network interface unit 91 from a computer 200 connected to a network.

The fixing unit 13 heats a recording paper sheet on which the image (toner image) is formed on the surface thereof by the image forming processing performed by the image forming unit 12, and fixes the image on the recording paper sheet by thermocompression.

As described above, the operation unit 47 receives the user's instruction with respect to operation and process that the image forming apparatus 1 is configured to perform. The operation unit 47 includes the touch panel type display unit 473 of for displaying the operation guidance screen to the user.

A hard disk drive (HDD) 92 is a large-capacity storage device for storing, for example, the source images read by the image reading unit 5.

The control unit 10 includes a controller 100. The controller 100 is connected to the image reading unit 5, the document feeder 6, the image processing unit 31, the image memory 32, the image forming unit 12, the fixing unit 13, the operation unit 47, the display unit 473, the network interface unit 91, and the HDD 92, and controls the driving of each of these.

For example, the control unit 10 acts, according to a display control program installed in the HDD 92, as the controller 100.

The controller 100 allows the display unit 473 to display the icons respectively associated with each of the functions included in the image forming apparatus 1, and detects and receives the user's touch operation performed on the icons. The controller 100 allows the display unit 473 to display an operation screen having a hierarchical structure. The hierarchical structure is arranged so as to have a home screen in the uppermost layer thereof, and the home screen is arranged with icons each indicating the functions operable by the image forming apparatus 1 respectively.

As described above, the operation screen has the hierarchical structure. The home screen, which is the uppermost layer in the operation screen, contains the icons arranged thereon and each of the icons is respectively associated with each of the functions included in the image forming apparatus 1. The operation screen is provided for each of the functions that are respectively associated with each of the icons arranged on the home screen. Respective corresponding relationship between each icon and each operation screen is stored, for example, in the RAM and ROM of the control unit 10, or in the HDD 92. When detecting the user's touch operation at any one of the icons arranged on the home screen, the controller 100 allows the display unit 473 to display the operation screen related to the function associated with the icon.

Figure 3:
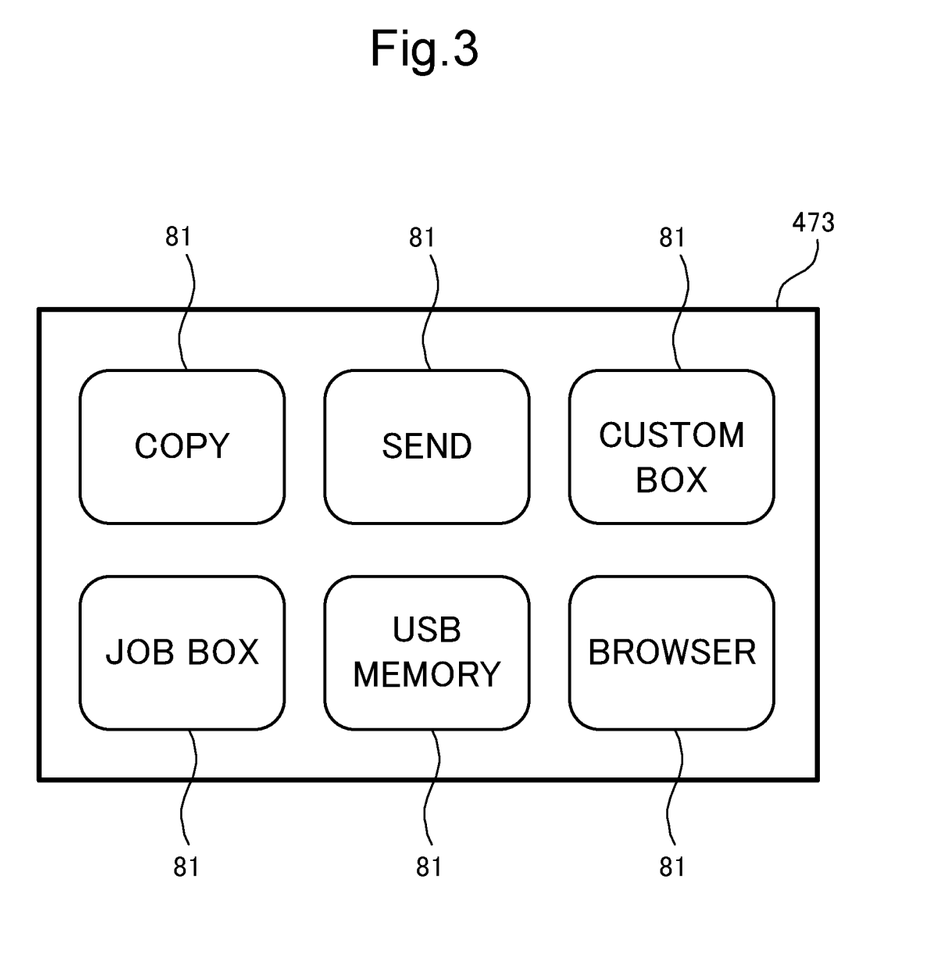
FIG. 3 is a view showing a display example of a home screen.

FIG. 3 is a view showing a display example of the home screen. Under the control of the controller 100, the home screen displays icons 81, each representing, for example, "COPY", "SEND", "CUSTOM BOX" "JOB BOX", "USB MEMORY", and "BROWSER", which are the functions included in the image forming apparatus 1. When detecting the user's touch operation at any one of the icons 81 displayed at the display unit 473, the controller 100 executes the function associated with the icon 81 displayed at the position where the touch operation has been detected.

Figure 4:
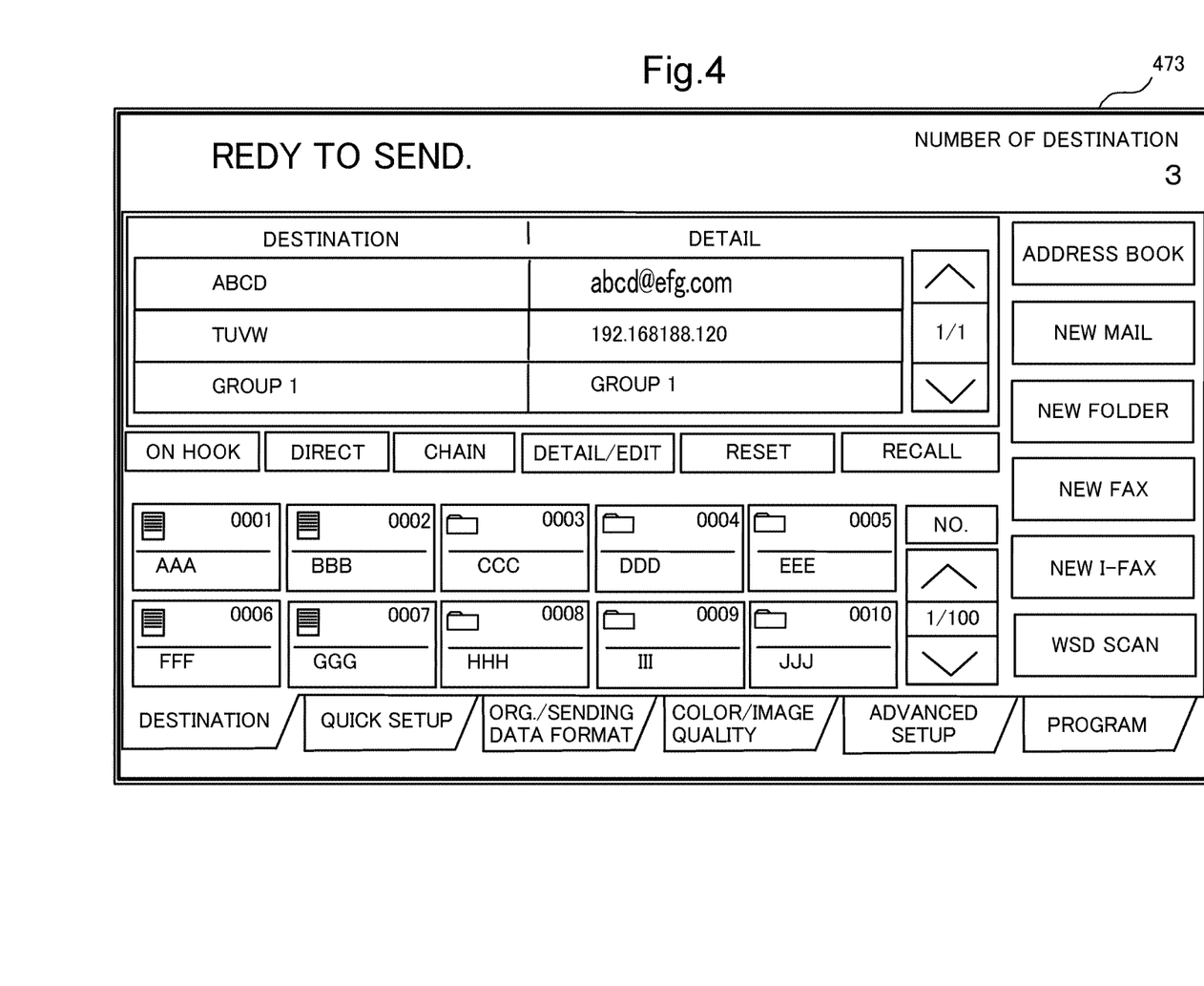
FIG. 4 is a view showing a display example of a top operation screen for a send function.
Figure 5:
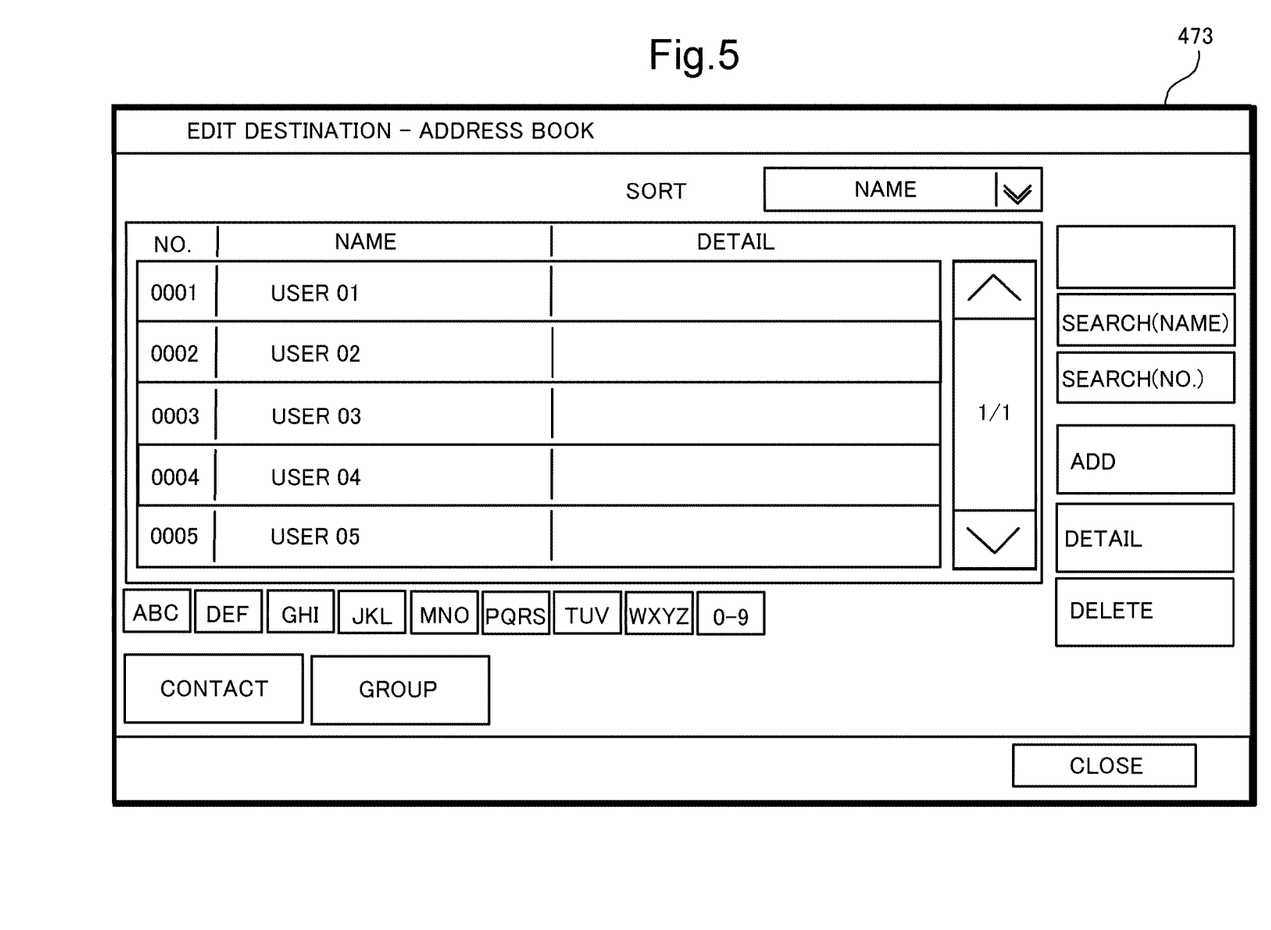
FIG. 5 is a view showing a display example of a detailed setting screen (an address book operation screen).

FIG. 4 is a view showing a display example of a top operation screen for the send function that is one of the aforesaid functions. The top operation screen is displayed at first. FIG. 5 is a view showing a display example of a detailed setting screen (an address book operation screen). For example, when detecting the user's touch operation at the "SEND" icon 81 which is associated with the send function and arranged on the home screen illustrated in FIG. 3, the controller 100 allows the display unit 473 to display the top operation screen for the send function as illustrated in FIG. 4. The top operation screen for the send function has an image for receiving an instruction to further call the detailed setting screen. The detailed setting screen is arranged at a lower layer and includes settings for the address book, facsimile transmission, and electronic mail transmission and so on (FIG. 5).

As described above, in response to the user's touch operation, the controller 100 appropriately switches the operation screen displayed at the display unit 473 and detects the touch operation performed on the icon and the button in the operation screen, thereby executing the function associated with the icon and the image displayed at the touched position, and receiving the setting thereof.

An icon displayed on a home screen in general is associated with a top operation screen for a function. In contrast, in the image forming apparatus 1 according to this embodiment, when detecting a predetermined user's touch operation, the controller 100 replaces the icon arranged on the home screen with a substitution icon. The substitution icon is formed in a different display mode and indicates that the detailed setting screens each associated with each of the functions can be directly called (displayed). When the user touches the substitution icon displayed on the home screen and the controller 100 detects the touch, the controller 100 allows the display unit 473 to omit the displaying of the top operation screen related to the function associated with the substitution icon and to display the detailed setting screen.

Figure 6:
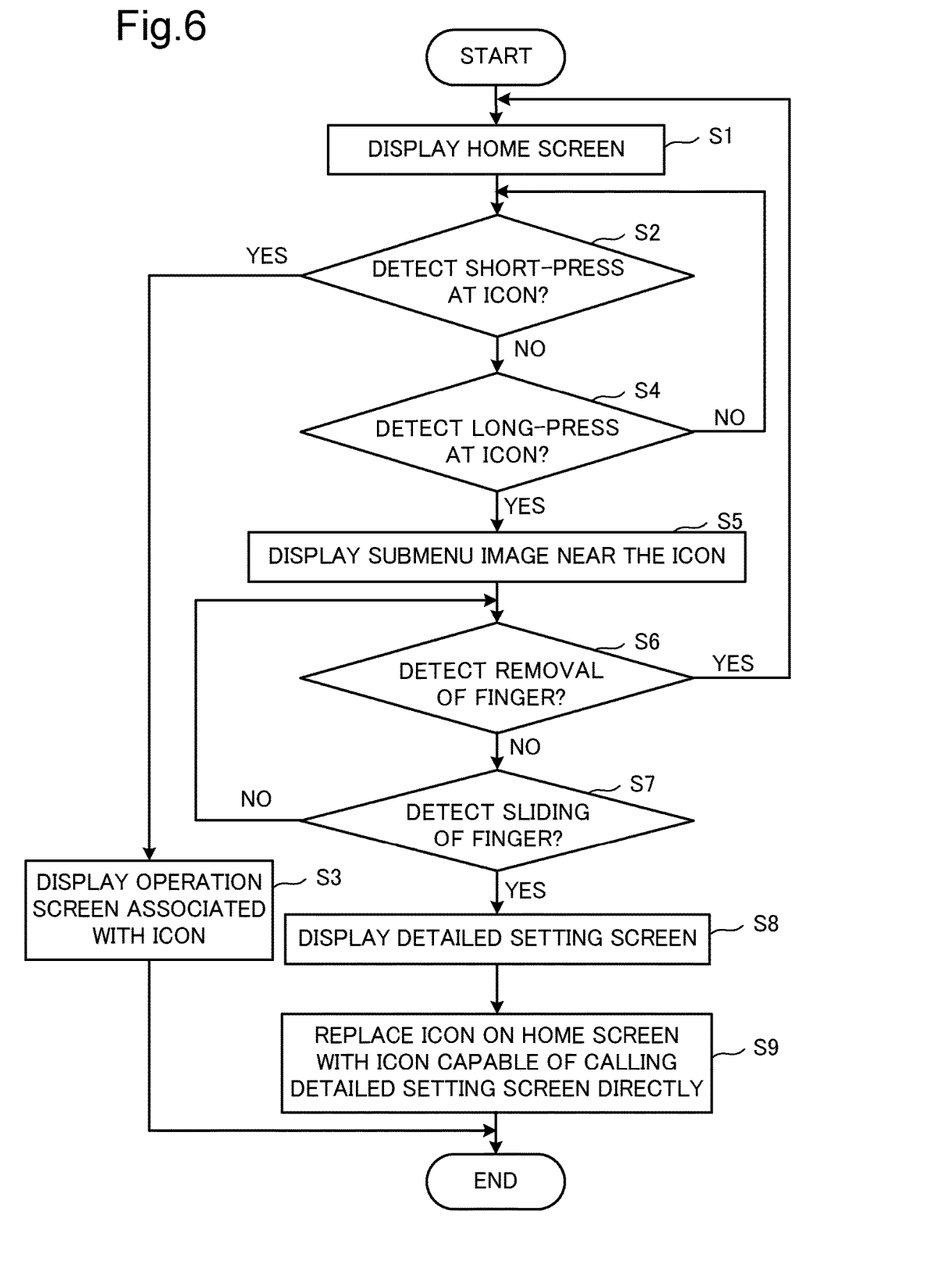
FIG. 6 is a flowchart showing a flow of a display control performed on a display unit.

A display control of the display unit 473 performed by the controller 100 will be detailed. FIG. 6 is a flowchart showing a flow of the display control performed on the display unit 473 by the controller 100.

When the image forming apparatus 1 is turned on or un-illustrated home button is pressed at the operation unit 47, the controller 100 allows the display unit 473 to display the home screen (S1). An example of the home screen is illustrated in FIG. 3.

After displaying the home screen, the image forming apparatus 1 enters a waiting state for the user's instruction. When detecting, through the touch panel function, a short-press (a touch operation within a predetermined short time period that is, for example, a time period shorter than 2 seconds) performed by the user at any one of the icons 81 (YES in S2), the controller 100 allows the display unit 473 to display the operation screen related to the function associated with the pressed icon 81 (S3). For example, when detecting the user's touch operation at the "SEND" icon 81 arranged on the home screen, the controller 100 allows the display unit 473 to display the top operation screen for the send function (see FIG. 4). Furthermore, when detecting the user's touch operation at an "ADDRESS BOOK" button displayed on the top operation screen, the controller 100 allows the display unit 473 to display the address book operation screen (see FIG. 5).

In contrast, when the touch operation detected at any one of the icons 81 through the touch panel function is not the short-press (NO in S2), but a long-press (a touch operation for about 2-3 seconds, which is longer than the aforesaid short time period) (YES in S4); the controller 100 allows the display unit 473 to display a popup image of the submenu image for selecting the detailed setting screen for the function associated with the pressed icon 81 at a predetermined position near a display region of the icon 81 (for example, at a position where a distance from the icon 81 becomes 5 mm) (S5). In a case where the icon 81 is neither short-pressed nor long-pressed (NO in S2, NO in S4), the controller 100 continuously waits for the instructions from the user.

Figure 7:
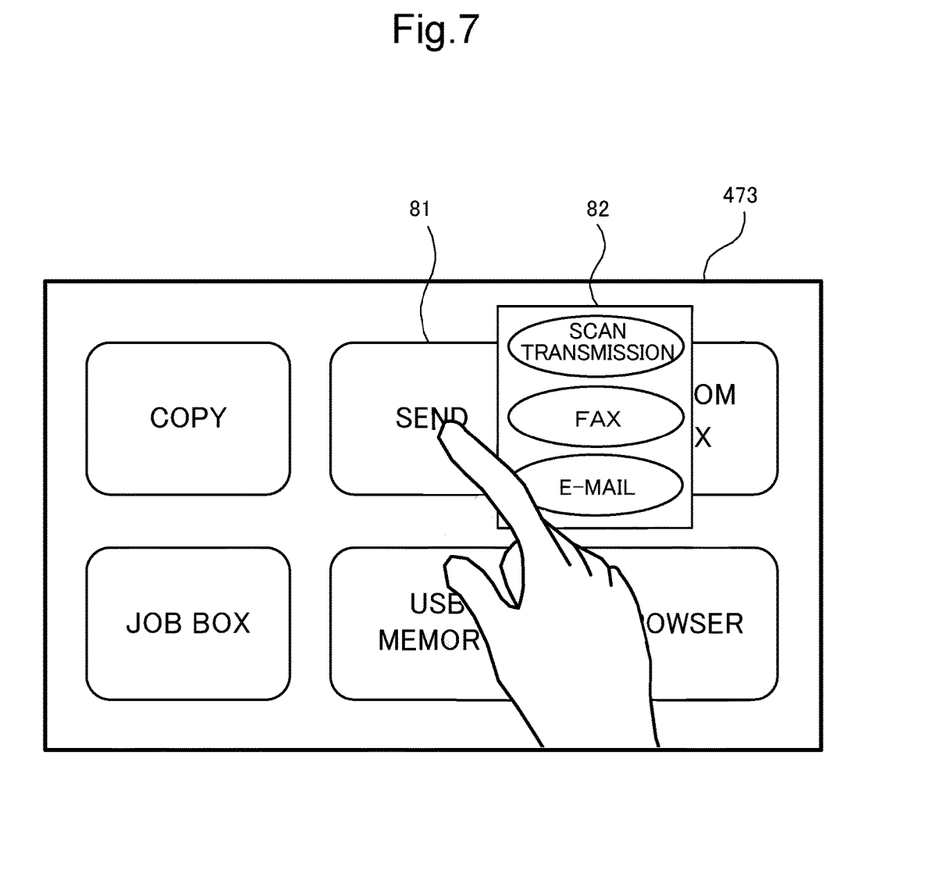
FIG. 7 is a view showing a display example of a submenu image when a long-press is performed on a "SEND" icon arranged on the home screen.

FIG. 7 is a view showing a display example of the submenu image when the long-press is performed on the "SEND" icon 81 arranged on the home screen. The controller 100, for example, allows the display unit 473 to display three options (buttons) of "SCAN TRANSMISSION", "FAX", and "E-MAIL" illustrated as the submenu image 82. The "SCAN TRANSMISSION" button is a button image for receiving an instruction to display the address book operation screen that is the detailed setting screen related to the scan function for sending the image of the source document scanned by the image reading unit 5. The address book operation screen (see FIG. 5) is a screen for receiving the destination designation in sending the image of the source document scanned by the image reading unit 5. The "FAX" button is a button image for receiving an instruction to display the detailed setting screen for the facsimile transmission that is one of the functions included in the send function. The "E-MAIL" button is a button image for receiving an instruction to display the detailed setting screen for the electronic mail transmission that is one of the functions included in the send function.

Back to FIG. 6, when detecting, through the touch panel function, that user's finger is removed from the display unit 473 at a position other than the region where the submenu image 82 is displayed (YES in S6), the controller 100 allows the display unit 473 to end displaying the submenu image 82 and to return to displaying of the home screen (S1). In a case where the controller 100 detects that the user: slides his/her finger from the long-pressed icon 81 to the submenu image 82 while keeping the finger on the display screen of the display unit 473; and removes the finger on any one of the submenu images (YES in S7), the controller 100 allows the display unit 473 to display the detailed setting screen related to the functions associated with the submenu image (S8).

For example, when the user slides his/her finger from the "SEND" icon 81 to the "SCAN TRANSMISSION" button on the submenu image 82, then removes the finger on the button on the home screen illustrated in FIG. 7, the controller 100 allows the display unit 473 to display the address book operation screen (see FIG. 5). In other words, it is possible to directly display the address book operation screen from the home screen, without displaying the top operation screen for the scan function.

Next, the controller 100 replaces the icon 81 having been long-pressed at the home screen with the icon capable of directly calling the detailed setting screen (S9). There, the icon replaced is formed in the different display mode. Namely, after switching the displaying of the detailed setting screen from the submenu image 82, the controller 100 performs a control of replacing the long-pressed icon 81 arranged on the home screen with the substitution icon formed in the different display mode when redisplaying the home screen. When detecting the touch operation at the substitution icon, the controller 100 allows the display unit 473 to display the detailed setting screen related to the function associated with the substitution icon (the same function as the one having been associated with the icon 81).

Figure 8:
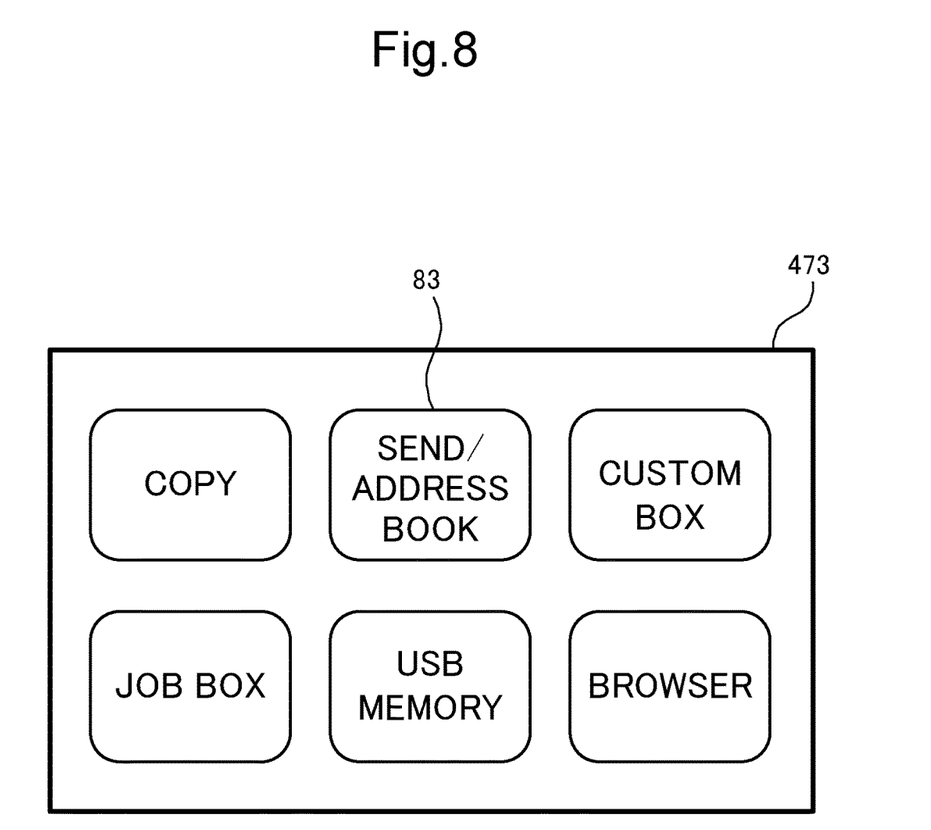
FIG. 8 is a view showing a display example of the home screen in which a replacement of the "SEND" icon was made.

FIG. 8 is a view showing a display example of the home screen in which the substitution icon has been displayed in place of the "SEND" icon. The controller 100 replaces the "SEND" icon 81, to which the long-press has been performed in step S4, with a "SEND/ADDRESS BOOK" icon 83, and then allows the display unit 473 to display the home screen (S1), in a case where: the address book operation screen is displayed as the detailed setting screen in step S8; the user finishes the desired operation at the address book operation screen; and the controller 100 allows the display unit 473 to redisplay the home screen. The "SEND/ADDRESS BOOK" icon 83 is associated with the address book operation screen. As illustrated in FIG. 8, the "SEND/ADDRESS BOOK" icon 83 is formed in the different display mode from the "SEND" icon 81. When detecting the short-press at the "SEND/ADDRESS BOOK" icon 83 on the home screen (YES in S2), the controller 100 allows the display unit 473 to display the address book operation screen associated with the "SEND/ADDRESS BOOK" icon 83. In other words, the controller 100 allows the display unit 473 to omit the displaying of the top operation screen for the send function (see FIG. 4) and to display the address book operation screen directly from the home screen.

Figure 9:
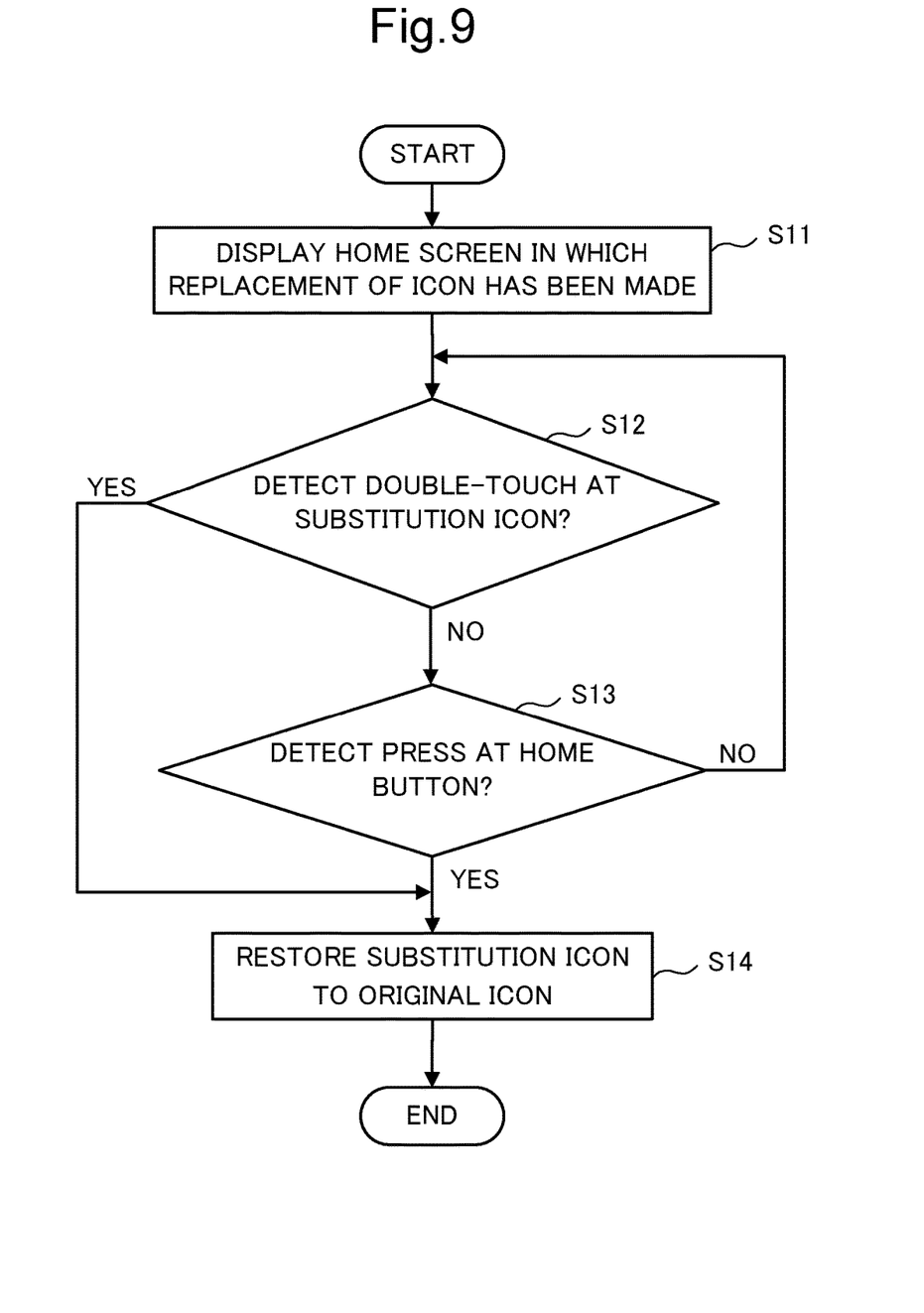
FIG. 9 is a flowchart showing a flow of processing for returning the home screen to an initial setting.

Processing for returning the icon having been replaced on the home screen in step S9 to its original display mode will be described. FIG. 9 is a flowchart showing a flow of processing for returning the home screen to an initial setting.

In a state of allowing the display unit 473 to display the home screen in which the replacement of the icon 81 has been made (S11), when detecting a double-touch operation at the substitution icon (YES in S12) or when detecting a press on an un-illustrated home button (one of hard keys constituting the operation unit 47) (YES in S13), the controller 10 allows the display unit 473 to restore the substitution icon to the original icon 81 (S14). In other words, the home screen returns to the state illustrated in FIG. 3. In contrast, when neither the double-touch operation on the icon having been replaced nor the press on the home button are detected (NO in S12 and NO in S13), the controller 100 allows the display unit 473 to continuously display the substitution icon on the home screen.

As described thus far, the user is capable of continuously using the substitution icon 83, and also capable of restoring the substitution icon displayed on the home screen to the original state.

In a general image forming apparatus, an operation screen has a hierarchical structure. There, icons each associated with respective functions are arranged on a home screen that is an uppermost layer in the hierarchical structure. When one of the icons is touched, a top operation screen for the function associated with the touched icon is displayed. Further, when a button displayed on the top operation screen for the associated function is touched, a detailed setting screen for setting detailed items is displayed. Thus, in a case of performing detailed settings for the function, a user needs to touch the icon at the home screen to have the top operation screen for the associated function be displayed, and further needs to touch the button displayed on the top operation screen to have the detailed setting screen be displayed. In other words, the general image forming apparatus requires many steps in order to display the detailed setting screen for the function, which impairs the conveniences of users.

In contrast, in the configuration according to this embodiment, as described thus far, the long-press on one of the icons 81 arranged on the home screen displayed on the touch panel type display unit 473 actuates the displaying of the submenu image for calling the detailed setting screen, and when the user performs the aforesaid predetermined operation on the submenu image, the embodiment is capable of omitting the displaying of the top operation screen and of making a display transition from the home screen to the detailed setting screen. This reduces the number of necessary steps in displaying the detailed setting screen for the respective function. Accordingly, the conveniences of users for setting the detailed setting screen for the function are improved.

As a matter of course, the disclosure may be modified in various manners without limitation to the foregoing embodiment. Although the case of performing the long-press on the "SEND" icon 81 is detailed in the foregoing embodiment, arrangements besides the above may be made. For example, when the "COPY" icon 81 is long-pressed, the controller 100 may popup display the submenu image including buttons such as "COLLECTION", "COLOR", and "DISCHARGE DESTINATION".

In addition, although the above embodiment is described taking the image forming apparatus as an example of the electronic device according to an embodiment of the present disclosure, the example is merely illustrative. The electronic device according to the present disclosure may be any other devices that include a display unit having a touch panel function, i.e., a mobile device, medical equipment, a ticket vendor, and a reservation system.

Further, the configurations and processes of the embodiment described with reference to FIG. 1 to FIG. 9 are merely exemplary, and not intended to limit the scope of the disclosure.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An electronic device comprising:
an operation unit being a user interface device that includes a display unit having a touch panel and receives a user's instruction through a touch operation performed by the user on the display unit; and
a controller that includes a processor and, based on operation of the processor in accordance with an operation program, allows the display unit to display an operation screen of the electronic device, the operation screen having a hierarchical structure in which a home screen is arranged in an uppermost layer in the hierarchical structure, the home screen being arranged with icons each indicating functions operable by the electronic device respectively,
wherein
in a case of detecting a short-press at one of the icons arranged on the home screen, the controller allows the display unit to display a top operation screen in the hierarchical structure of the function indicated by the one icon,
in a case of detecting a long-press at the one icon arranged on the home screen, the controller allows the display unit to display, at a predetermined position near a display region of the one icon, a submenu image for selecting detailed settings for the function associated with the one icon, the submenu image being arranged at a layer lower than the top operation screen,
when detecting that the touch operation performed by the user is moved from the one icon to the submenu image and then ended at the submenu image, the controller allows the display unit to display a detailed setting screen for setting detailed setting items indicated by the submenu image, and
after switching the displaying of the detailed setting screen from the submenu image, when allowing the display unit to redisplay the home screen, the controller replaces the long-pressed icon with a substitution icon having a different display mode from the long-pressed icon, and allows the display unit to display the substitution icon, and when detecting the touch operation by the user at the substitution icon, the controller allows the display unit to omit the displaying of the top operation screen related to the function associated with the substitution icon and to display the detailed setting screen.

2. The electronic device according to claim 1, wherein when detecting a double touch operation at the substitution icon, the controller restores the substitution icon to the icon originally displayed and allows the display unit to display the restored original icon.

3. The electronic device according to claim 1, wherein when detecting that the touch operation by the user is ended at a position other than the predetermined position where the submenu image is displayed, the controller allows the display unit to stop displaying the submenu image.

4. An image forming apparatus comprising:
the electronic device according to claim 1; and
an image forming unit that forms an image on a recording medium.

5. The image forming apparatus according to claim 4, wherein the functions include at least a copy function and a send function.

* * * * *